United States Patent
McLean et al.

(10) Patent No.: US 6,857,709 B1
(45) Date of Patent: Feb. 22, 2005

(54) NON-ROTATING WHEEL COVER

(75) Inventors: Bruce E. McLean, Vancouver (CA); Ian M. Klassen, Delta (CA); Keith L. Constable, Coquitlam (CA); Stephen Smith, Coquitlam (CA)

(73) Assignee: AAI Technology Inc., Dover Kent, DE (US)

( * ) Notice: Subject to any disclaimer, the term of this patent is extended or adjusted under 35 U.S.C. 154(b) by 0 days.

(21) Appl. No.: 10/735,786

(22) Filed: Dec. 16, 2003

(51) Int. Cl.⁷ .................................................. B60B 7/04
(52) U.S. Cl. .............................. 301/37.25; 301/37.105
(58) Field of Search .................. 301/111.03, 108.1, 301/111.07, 37.105, 37.25, 37.101, 37.108, 37.23, 37.37, 37.35, 37.36, 63.101; 40/587, 591

(56) References Cited

U.S. PATENT DOCUMENTS

| | | | | |
|---|---|---|---|---|
| 2,146,980 A | * | 2/1939 | Parks | ............................ 40/587 |
| 6,045,195 A | | 4/2000 | Okamoto et al. | |
| 6,120,104 A | * | 9/2000 | Okamoto et al. | ......... 301/37.25 |
| 6,443,529 B1 | * | 9/2002 | Williams | .................. 301/37.25 |
| 6,692,085 B1 | * | 2/2004 | Threadgill | ............. 301/37.103 |

* cited by examiner

Primary Examiner—Frantz F. Jules
(74) Attorney, Agent, or Firm—Oyen Wiggs Green & Mutala (57) ABSTRACT

This invention relates to a novel non-rotating wheel cover for use with vehicle wheels. More particularly, this invention pertains to a wheel cover which fits over the central part of a vehicle wheel and remains stationary when the vehicle wheel is rotating. A wheel cover assembly comprising: (a) a wheel cover disk; (b) a hub arm which is removably attachable to the interior face of the wheel cover disk; (c) a weight which is connected to the base of the hub arm; (d) a base plate which has stud receiving holes formed therein, the base plate being rotatably connected to the hub arm.

19 Claims, 7 Drawing Sheets

NON-ROTATING WHEEL COVER

FIELD OF THE INVENTION

This invention relates to a novel non-rotating wheel cover for use with vehicle wheels. More particularly, this invention pertains to a wheel cover which fits over the central hub of a vehicle wheel and does not rotate when the vehicle wheel is rotating.

BACKGROUND OF THE INVENTION

A number of non-rotating wheel cover designs have been developed over the years. However, such designs are usually overly complicated in structure, or do not in fact remain stationary at various vehicle speeds, or are difficult to remove and reinstall when servicing the vehicle wheel.

U.S. Pat. No. 6,045,195, granted Apr. 4, 2000, Okamoto, discloses a wheel cover which includes a fixable side fixture fixably mounted to the center of a wheel of a vehicle, so as to be able to position the cover to the central part thereof. A movable side fixture is pivotally mounted to the central part of the fixable side fixture through a bearing. A wheel cover body, substantially in the shape of a disc and mounted on the movable side fixture, has a space between itself and the wheel. A device for biasing the wheel cover body, in order to prevent integral rotation with the wheel, is included. A dynamo is mounted on the movable side fixture or wheel cover body and driven rotatably by rotating the wheel. The dynamo is mounted on the wheel cover so as to generate electricity by rotation with the wheel and wheel cover body mounted rotatably to the wheel when the vehicle is in motion. Electricity generated by the dynamo is used for illumination or transmission of an electro-magnetic wave, or the like, as power source.

U.S. Pat. No. 6,120,104, granted Sep. 19, 2000, Okamoto et al., discloses a wheel cover comprising a fixable side fixture fixably secured to the center of a wheel of a car. A movable side fixture is pivotably mounted to the central part of the fixable side fixture through a bearing. A wheel cover body in the shape of a disk is mounted orthogonally to the movable side fixture, having a space between the wheel. A weight is mounted to the movable side fixture or the wheel cover body, in order to prevent rotation of the wheel cover body so that people can see a design on the wheel cover body.

U.S. Pat. No. 6,443,529 B1, granted Sep. 2, 2002, Williams, discloses an image-holding assembly which is intended for mounting over a wheel of a motor vehicle. The assembly has a base plate for attaching to the wheel, a non-rotatable disk mount coupled to the base plate and a disk cover secured to the non-rotatable disk mount. The disk cover carries a text, design or other desired image. The disk cover does not rotate with the wheel. The image remains discernable regardless of whether the vehicle is parked or is traveling along a roadway.

SUMMARY OF INVENTION

The invention is directed to a wheel cover assembly, for fitting to the exterior of a vehicle hub which is mounted on a vehicle axle, comprising: (a) a wheel cover disk; (b) a hub arm which is removably attachable in an axial direction to the interior face of the wheel cover disk; (c) a weight which is connected to the base of the hub arm; (d) a base plate which has stud receiving holes formed therein for removable connection to the vehicle hub, the base plate being rotatably connected to the hub arm.

The cover assembly can include at least one guide member located on the inside face of the wheel cover disk, the member cooperating with a corresponding guide member formed in the hub arm in a manner which ensures that the cover disk is fitted to the hub arm in only one position. The interior face of the wheel cover disk can include at least two guide protrusions which can fit into corresponding receptacles in the hub arm. The interior face of the wheel cover disk can include an asymmetrical group of guide protrusions which can fit into corresponding receptacles in the hub arm and ensure that the disk is installed in an upright position. The base plate can be connected to the hub arm by a shaft.

The cover assembly can include a pair of protrusions with holes therein which can fit within a corresponding pair of protrusion receiving receptacles located in the hub-arm, the protrusions and protrusion receiving receptacles being secured together by securement members. The cover assembly can include a pair of spaced apart hub arm guides located on the inside face of the cover disk, the guides respectively receiving between them the sides of the hub arm, when axially fitted against the interior face of the wheel cover disk.

The base plate can be secured by a base connection to a shaft which can fit within a rotatable bearing formed in an interior region of the hub arm and can enable the base plate, base connection and bearing shaft to rotate relative to the hub arm and the cover disk. The weight can be pivotal or affixed relative to the hub arm. The hub arm and the guides can have reinforcing ribs thereon.

The base plate, base connection, bearing shaft and hub arm can be fitted over the guide members formed in the inside face of the cover disk in a direction which can be perpendicular to the plane of the cover disk.

The base plate can be a circular ring with stud receiving holes therein and the base connection can have three legs for affixing the base connection to the base plate.

The guide protrusions can be disposed in an asymmetrical pattern so that the cover disk can be affixed to the hub arm in only one orientation. The assembly can include on the cover disk or the hub arm a position member that ensures that the cover disk and the hub arm can be secured together in only one position.

The cover assembly can include at least one spacer member between the cover disk and the hub arm, it can include a directional arrow on the wheel cover disk and it can include at least one stud hole insert which can be installed into a stud receiving hole.

BRIEF DESCRIPTION OF DRAWINGS

In drawings which illustrate specific embodiments of the invention, but which should not be construed as restricting the spirit or scope of the invention in any way.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
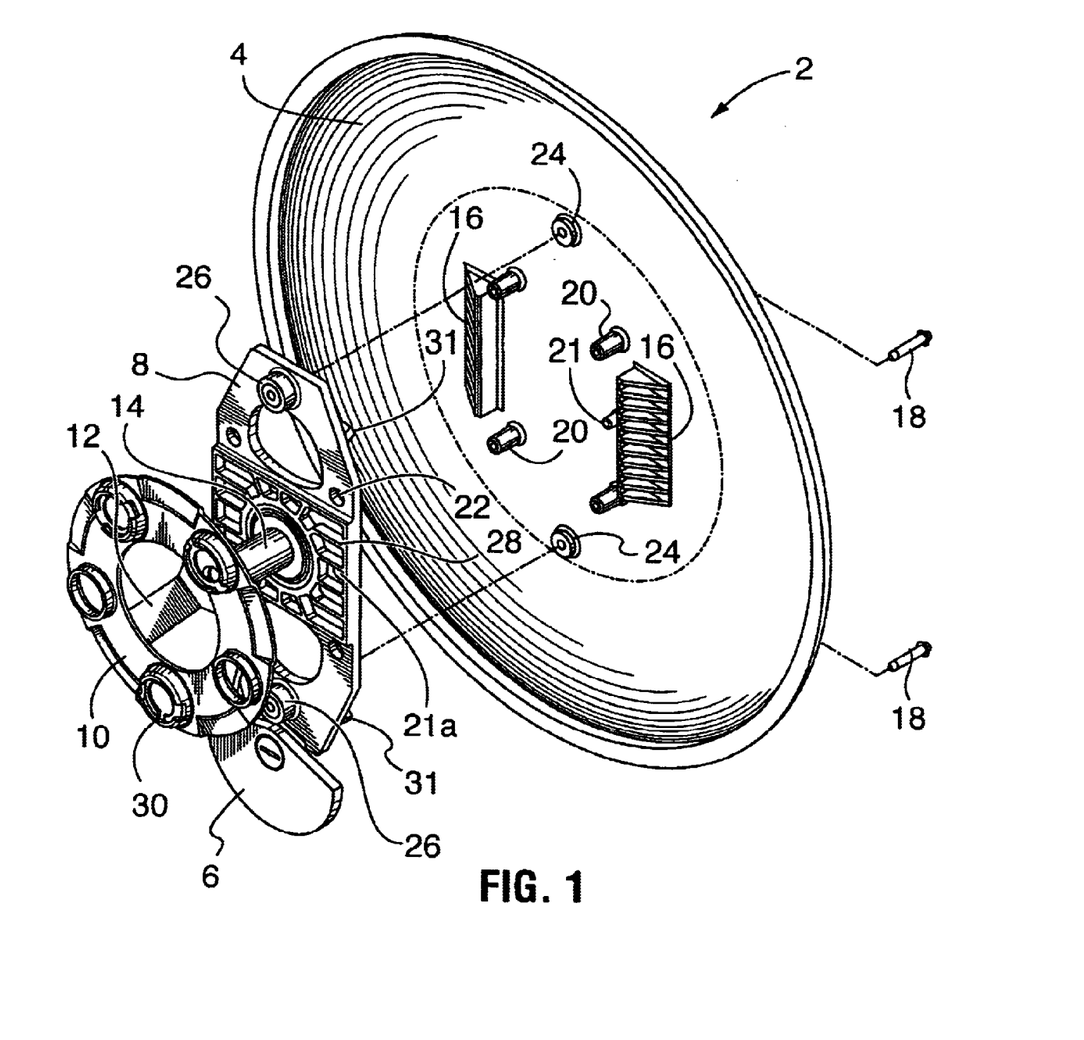
FIG. 1 illustrates an isometric exploded view of the inside of the non-rotating wheel cover according to the invention.

As seen in the drawings, FIG. 1 illustrates an isometric exploded view of the inside of a non-rotating wheel cover according to the invention. The wheel cover assembly 2 is constructed of a circular cover disk 4 which is intended to substantially cover the wheel rim area of the vehicle tire and rim assembly. The hub and wheel cover attachment assembly is constructed of a hub arm 8, which is connected by a bearing shaft 14 to a circular base plate 10 by means of a base connection 12. A weight 6 is either pivotally or fixedly connected to the bottom end of the hub arm 8. A pair of hub arm guides 16 are secured in spaced parallel orientation on the inside face of the cover disk 4. The hub arm 8 has at the top and bottom regions thereof a pair of stud receptacles 26. These are received, as indicated by the dotted lines, on a pair of corresponding stud protrusions 24 which are formed on the inside face of the cover disk 4. The hub arm 8 also has formed on the side facing the cover disk 4 four spacers 31 (two of which are visible in FIG. 1) which hold the hub arm 8 a specified distance from the cover disk 4. The spacers 31 also provide stability.

Located between the parallel spaced pair of hub arm guides 16, in a rectangular or square relationship on the inside face of the cover disk 4, are four guide pins 20 which respectively fit within four congruently located guide pin holes 22 that are formed in the hub arm 8. The hub arm 8, with assembled circular base plate 10, base connection 12 and bearing shaft 14, is moved into place in perpendicular manner (axial direction) against the interior face of the cover disk 4, to a position between the spaced parallel hub arm guides 16 and over the four guide pins 20. The cover disk 4 is then secured to the hub arm 8 by a pair of securement members such as rapier studs 18, which extend from the exterior of the cover disk 4 through the pair of stud protrusions 24 and into the stud receptacles 26 formed in the hub arm 8. The front or exterior face of the cover disk 4 is neat and has no significant detracting fastening attachments other than the small heads of the two rapier studs 18. This is advantageous because it then leaves the front or exterior face of the cover disk 4 clean for carrying or displaying various advertising logos, designs and the like.

As seen in FIG. 1, one end of the bearing shaft 14, which can also be regarded as a center spacer, the length of which can be varied, is mounted in the central area of the hub arm 8 by means of a ball or roller bearing (see FIG. 3), and is thus free to rotate relative to the hub arm 8 and the cover disk 4. The circular base plate 10 and the base connection 12, which are connected in series to an opposite end of the shaft 14, is also free to rotate. Thus, when holes 30 of the circular base plate 10 are fitted over the studs of a conventional vehicle wheel, and stud nuts tightened into place, the base plate 10, the base connection 12 and the shaft 14 are free to rotate while the cover disk 4 and hub arm 8, along with weight 6, remain stationary or non-rotating. The advantage of the non-rotating wheel cover assembly as illustrated in FIG. 1 is that the circular base plate 10, with its five stud receiving holes 30, is easy to mount on the hub bolts on a conventional vehicle wheel, while the combination of the parallel spaced guides 16, the four locating guide pins 20, facilitate installing the cover disk 4 onto the hub arm 8. The rapier studs 18 also make it easy to secure the cover disk 4 to the stud receptacles 26 formed in hub arm 8.

FIG. 1 also illustrates a position pin 21 which is located between two of the guide pins 20 on one side of the cover disk 4. A corresponding position pin hole 21a is located in hub arm 8. This position pin 21 and the corresponding hole 21a ensure that the cover disk 4 can be fitted to the hub arm 8 in only one upright position. This ensures that the advertising message that is displayed on the exterior face of the cover disk 4 is always upright.

Figure 2:
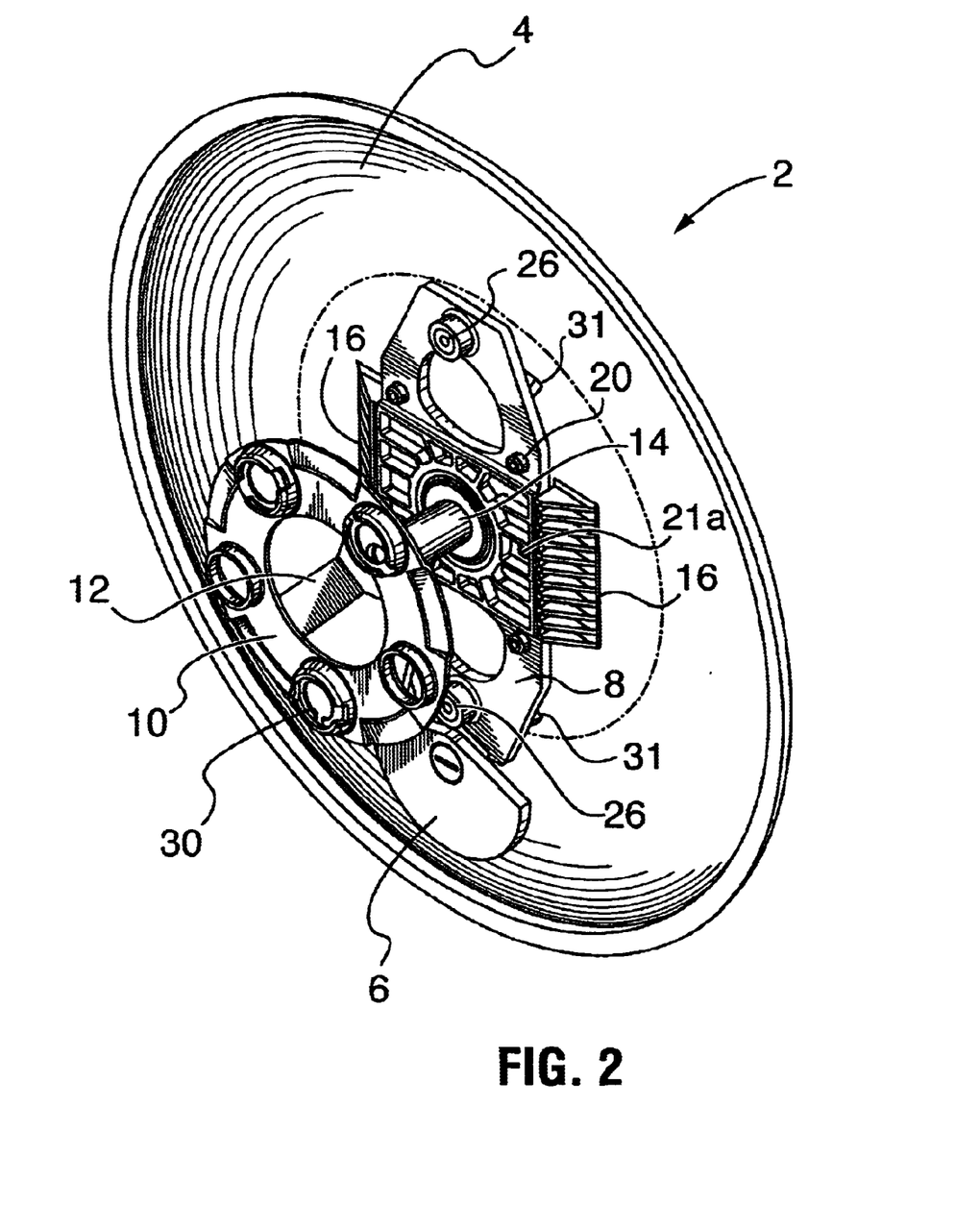
FIG. 2 illustrates an isometric view of the inside of the assembled non-rotating wheel cover.

FIG. 2 illustrates an isometric view of the inside of the assembled non-rotating wheel cover. As seen in FIG. 2, the hub arm 8, with assembled circular base plate 10, base connection 12 and bearing shaft 14 are securely installed between the spaced pair of parallel guides 16, within the inside face of the cover disk 4 at a distance determined by the spacers 31. As mentioned above, since the circular base plate 10, because of rotatable shaft 14, is free to rotate with the vehicle wheel, the cover disk 4, together with hub arm 8, and weight 6, remains stationary or non-rotating so that advertising indicia displayed on the exterior face of the cover disk 4 can be viewed by observers, even when the vehicle wheel is rotating. The position pin 21 and hole 21a ensure that the indicia is upright. The design of the wheel cover assembly 2 is universal and accommodates the wheels on both sides of the vehicle.

Figure 3:
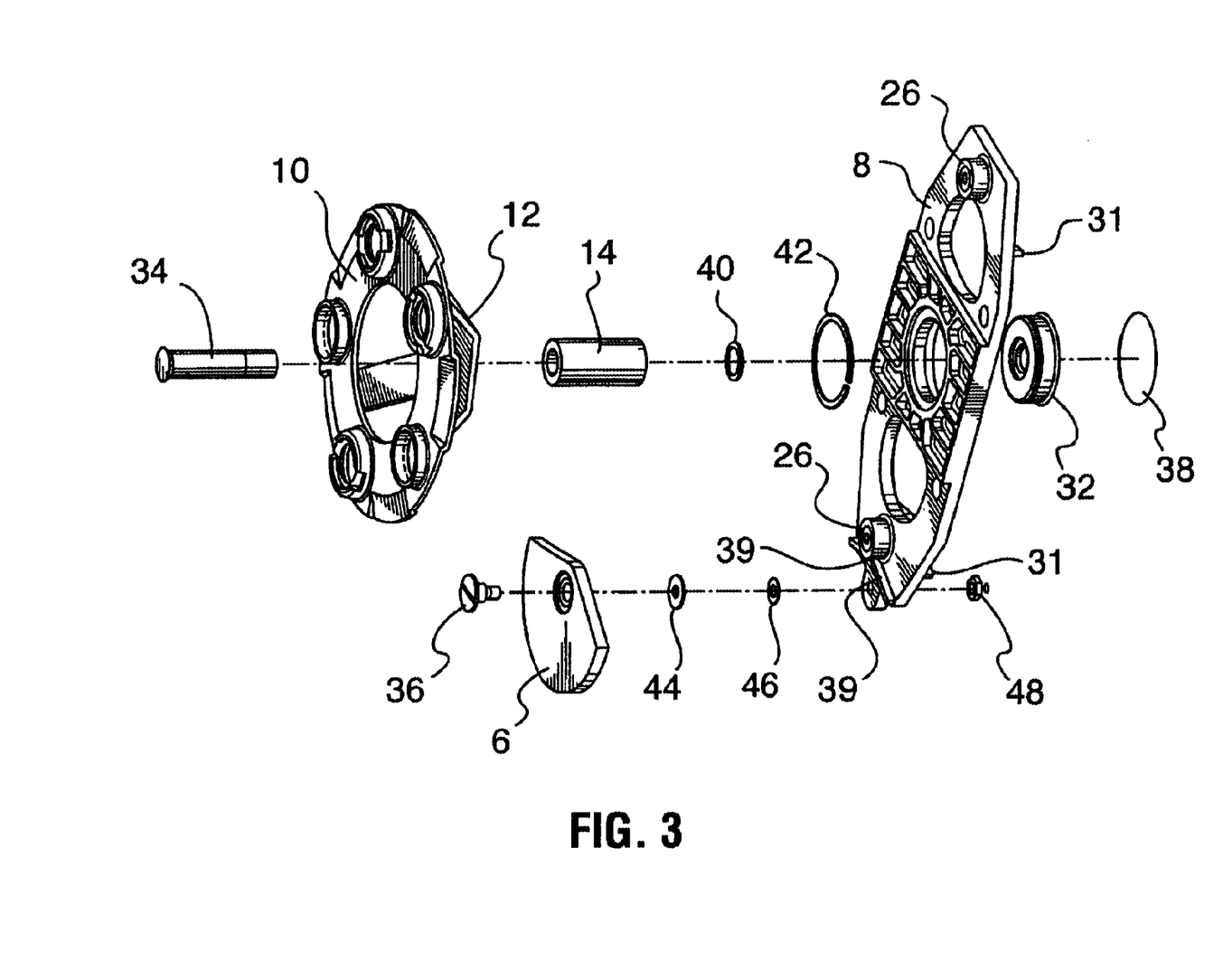
FIG. 3 illustrates an isometric exploded view of the cover mounting components of the non-rotating wheel cover.

FIG. 3 illustrates an isometric exploded view of the cover mounting components of the non-rotating wheel cover. As seen in FIG. 3, the circular base plate 10, together with the three-legged base connection 12, is connected to the base arm 8 by a bearing shaft (center spacer) 14 and a center bolt 34. The length of the bearing shaft 14 can be varied to accommodate different sizes and designs of vehicle wheels. The bearing shaft assembly also includes a disk spring 40 and a circlip washer 42. A ball bearing 32 fits within a circular recess in the central area of the hub arm 8 and receives one end of the bearing shaft 14 and the center bolt 34. The distance of protrusion of the spacers 31 can be varied to accommodate different thicknesses of bearing 32. An identifier label 38 fits on the rear face of the ball bearing 32. The combination of the ball bearing 32, bearing shaft 14, disk spring 40 and circlip washer 42 enables the circular base plate 10 and the base connection 12 to rotate relative to hub arm 8.

FIG. 3 also illustrates the manner in which weight 6 is either pivotally or fixedly attached to the base of the hub arm 8. A weight bolt 36 fits through an opening in the weight 6, and then through a washer 44 and a disk spring 46, and is fastened on the opposite side of the hub arm 8 by a nut 48. The weight 6 can be set to either pivot or remain stationary, depending upon the tightness of the weight bolt 36 and the nut 48. The base area of the hub arm 8 can include an optional ridge 29 which holds the weight 6 in a fixed position if desired. This feature provides flexibility. At certain speeds, it may be found that the cover remains stationary when the weight 6 is pivotal. At other speeds, it may be found that a fixed weight 6 with the inclusion of the ridge 39 provides best results.

Figures 4, 5, 6:
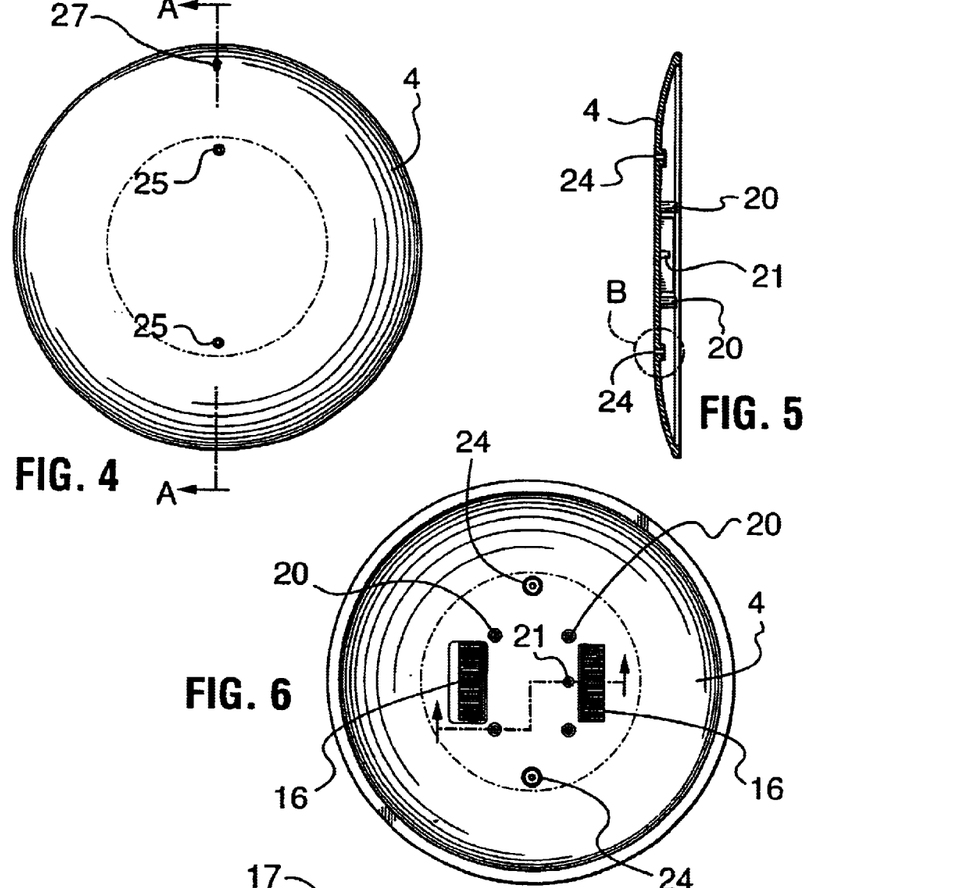
FIG. 4 illustrates an elevation view of the outside of the non-rotating wheel cover.
FIG. 5 illustrates a section view taken along section line A—A of FIG. 4.
FIG. 6 illustrates an inside elevation view of the non-rotating wheel cover.

FIG. 4 illustrates an elevation view of the front exterior side of a vehicle cover. As seen in FIG. 4, the front face of the cover disk 4 has only two holes 25 for receiving the pair of rapier studs 18 (see FIG. 1). This provides a clean face to the exterior of the cover disk 4 for displaying advertising indicia. FIG. 4 also illustrates a small upright arrow 27 which directs an installer to install a message on the cover disk 4 right side up.

FIG. 5 illustrates a section view taken along section line A—A of FIG. 4. FIG. 5 is useful for illustrating the concave configuration of the cover disk 4 and the location of the two interior stud protrusions 24, guide pins 20, and the position pin 21.

FIG. 6 illustrates an elevation view of the interior side of the wheel cover. As seen in FIG. 6, the interior face of the cover disk 4 has thereon the spaced parallel pair of hub arm guides 16, as well as the four square or rectangular positioned guide pins 20. Stud protrusions 24 are located above and below the pair of guides 16. FIG. 6 also shows the position pin 21 which ensures that the cover disk 4 can only be installed axially on the hub arm 8 in an upright position.

Figure 7:
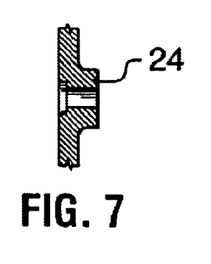
FIG. 7 illustrates a detail B of the circled area designated B in FIG. 5.

FIG. 7 illustrates a detail B of the circular area designated B in FIG. 5. As seen in FIG. 7, the stud protrusion 24 has an opening extending therethrough, which receives a securement member such as a rapier stud 18 as discussed previously in association with FIG. 1.

Figure 8:
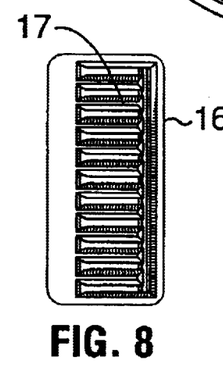
FIG. 8 illustrates a detail D of the area designated D in FIG. 6.

FIG. 8 illustrates a detail D of the area designated D in FIG. 6. FIG. 8 illustrates that the hub arm guides 16 are formed with ribs 17, which increase the strength of the guides 16, but reduce overall weight.

Figure 9:
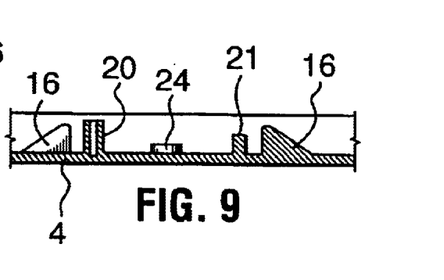
FIG. 9 illustrates a section view taken along section line C—C of FIG. 6.

FIG. 9 illustrates a section view taken along section line C—C of FIG. 6. FIG. 9 illustrates the relative positions of the pair of guides 16, one of the stud protrusions 24, one of the guide pins 20 and the position pin 21 on the interior face of the cover disk 4.

Figure 10:
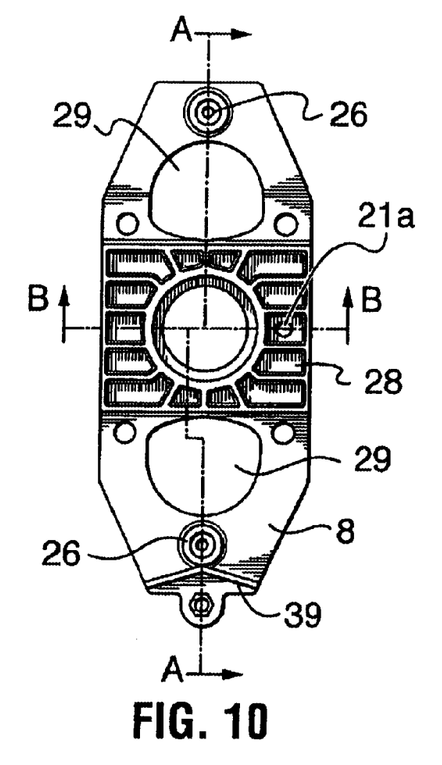
FIG. 10 illustrates a front elevation view of a hub arm.

FIG. 10 illustrates a front elevation view of a hub arm 8. As seen in FIG. 10, the pair of stud receptacles 26 are located at the top and bottom areas of the hub arm 8. The inside face of the hub arm 8 has formed therein a pattern of reinforcing ribs 28, which add strength to the hub arm 8 without excessive weight. The hub arm 8 has a pair of openings 29 which also reduce the overall weight of the hub arm 8. The location of hole 21a for the position pin 21 is also shown. The optional weight ridge 39 for fixing the position of the weight 6 (not shown) is also illustrated.

Figure 11:
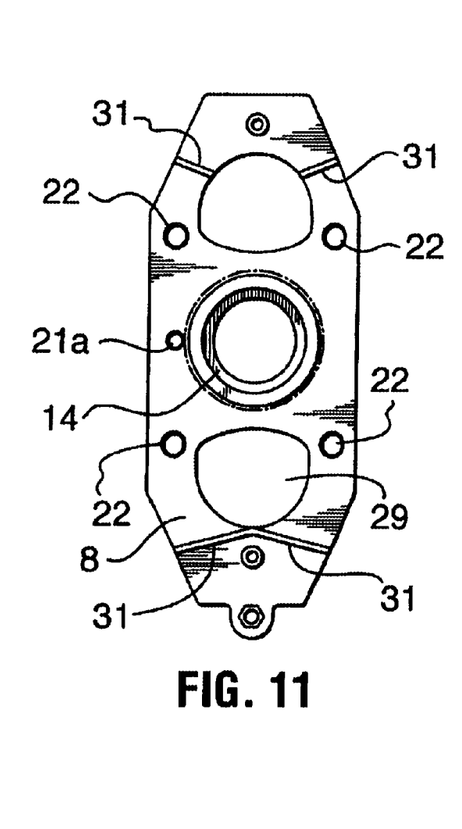
FIG. 11 illustrates a rear elevation view of a hub arm.

FIG. 11 illustrates a rear elevation view of the hub arm 8. The hub arm 8, as seen in FIG. 11, shows the four rectangular or square arranged guide pin holes 22 as well as the bearing shaft 14 in the central area. FIG. 11 also illustrates the position of a position pin hole 21a which fits with a corresponding pin 21 on the cover disk 4 and thereby ensures that the hub arm 8 is always installed in an upright position on the interior face of the cover disk 4. FIG. 11 also illustrates the four spacers 31 which hold the hub arm 8 away from the cover disk 4.

Figure 12:
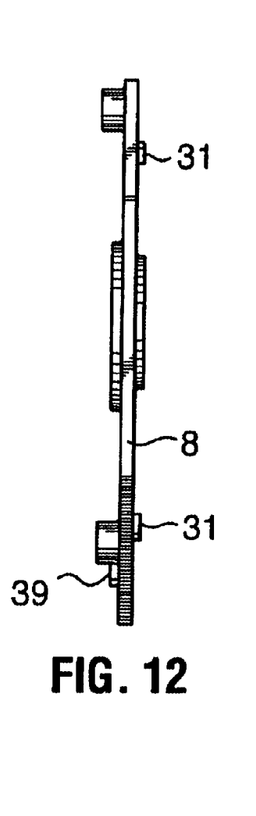
FIG. 12 illustrates a side view of a hub arm.
Figure 13:
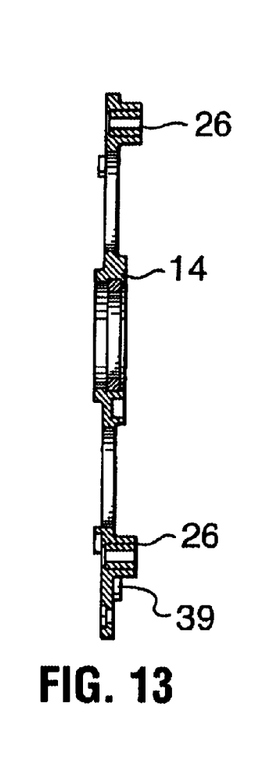
FIG. 13 illustrates a section view taken along section line A—A of FIG. 10.
Figure 14:
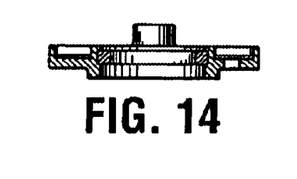
FIG. 14 illustrates a section view taken along section line B—B of FIG. 10.

FIG. 12 illustrates a side view of a hub arm. FIG. 13 illustrates a section view taken along section line A—A of FIG. 10. FIG. 14 illustrates a section view taken along section B—B of FIG. 10. These figures provide additional insight into the construction of the hub arm 8.

Figure 15:
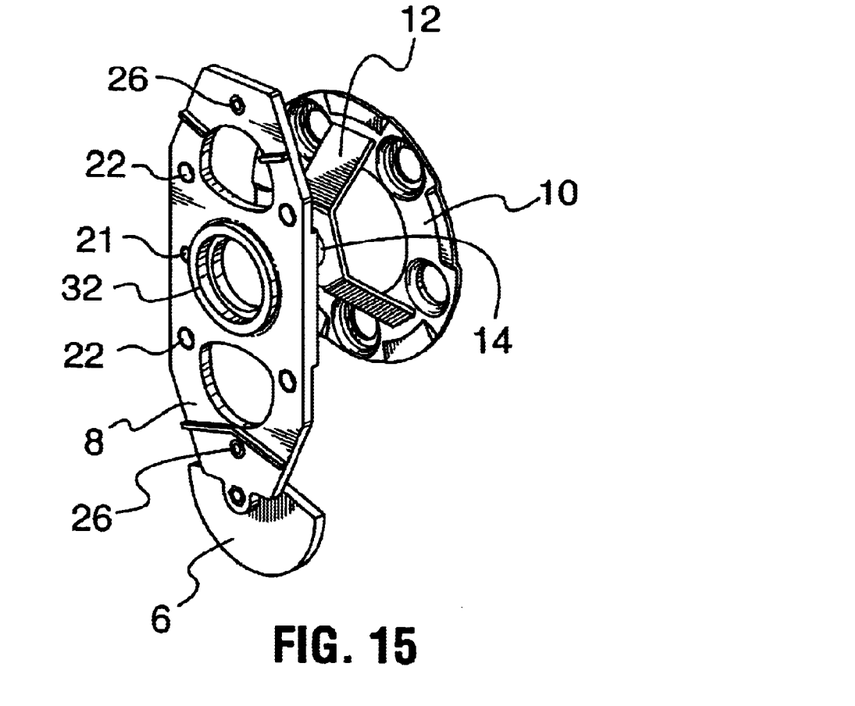
FIG. 15 illustrates an isometric view of a hub arm connected by a base connection to a base plate.

FIG. 15 illustrates an isometric view of a hub arm connected by a base connection with a base plate. As seen in FIG. 15, the hub arm 8 and weight 6 are rotatably assembled with the three-legged base connection 12 and circular base plate 10 by shaft 14. The four guide pin holes 22 and the position pin hole 21 are readily visible on the rear face of the hub arm 8.

Figure 16:
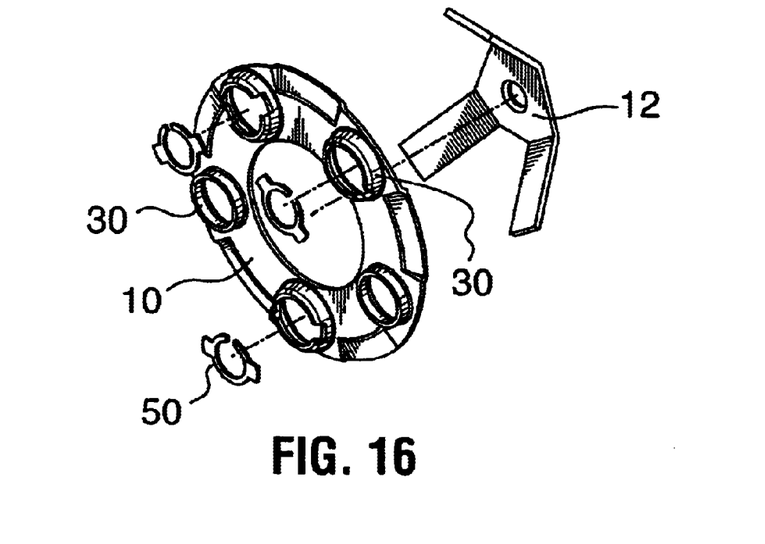
FIG. 16 illustrates an isometric view of a base plate and a base connection.

FIG. 16 illustrates an isometric view of a base plate and a base connection. The three-legged base connection 12 is connected to the circular base plate 10. The circular base plate 10 has formed therein five hub stud holes 30 which are positioned to fit over the five studs of a hub of a conventional vehicle wheel rim. Three of the five hub bolt holes 30 have respective stud hole inserts 50 which fit within the respective hub stud holes 30. The hub stud hole 30 openings are large enough to fit over the nuts on studs of a conventional vehicle hub. However, with the three inserts 50, only three of the five stud nuts need to be removed in order to install the base plate 10 over the five hub studs and then secure the three studs with three stud nuts. It is understood that the circular base plate 1 can be varied in design to fit various designs of vehicle hubs, for instance, a hub with six or eight studs.

Figure 17:
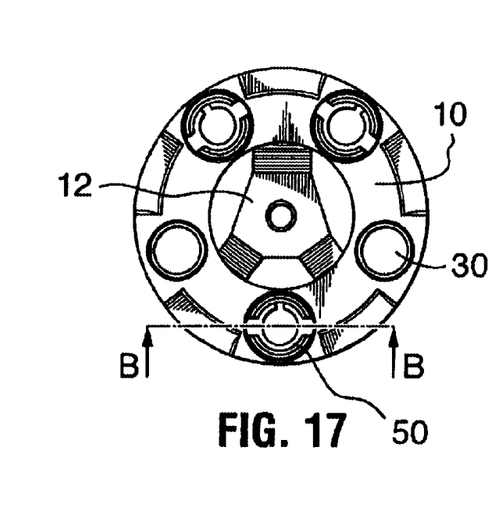
FIG. 17 illustrates a front elevation view of a base plate.

FIG. 17 illustrates a front elevation view of a base plate. The circular base plate 10 has the three legs of the base connection 12 centrally located in the interior thereof. The position of the five hub stud holes 30, together with three stud hole inserts 50, are also illustrated clearly in FIG. 17.

Figure 18:
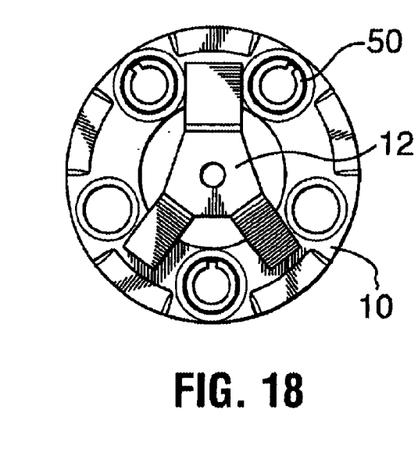
FIG. 18 illustrates a rear elevation view of a base plate with base connection.

FIG. 18 illustrates a rear elevation view of a base plate with base connection. The three-legged base connection 12 is secured to the circular base plate 10 by spot welding or some other suitable mechanism. The three base nuts 50 are also illustrated in FIG. 18.

Figure 19:
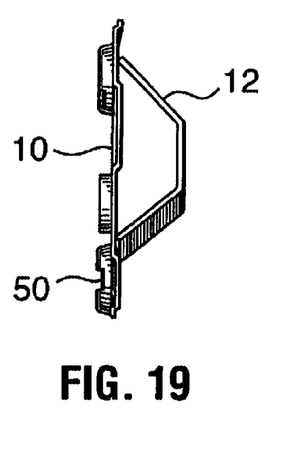
FIG. 19 illustrates a side view of a base plate and base connection.
Figure 20:
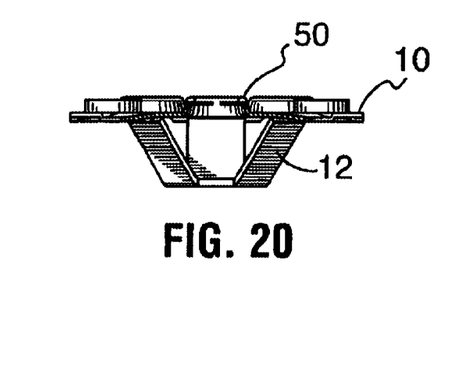
FIG. 20 illustrates a section view taken along section line B—B of FIG. 17.
Figure 21:
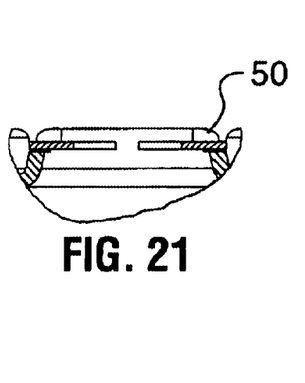
FIG. 21 illustrates a detail X of the area designated by an X in FIG. 20.

FIG. 19 illustrates a side view of a base plate and base connection. FIG. 20 illustrates a section view taken along section line B—B of FIG. 17. FIG. 21 illustrates a detail X of the area designated by an X in FIG. 20. These figures provide insight into the details of construction of the base plate and base plate connection.

It will be understood that if desired, the guide pins 20 and the position pin 21 can be formed on the hub arm 8, and corresponding pin receiving receptacles can be formed on the interior surface of the cover disk 4. Furthermore, the spacers 31 can be formed in the inside surface of the cover disk 4 rather than on the hub arm 8 in order to provide space between the hub arm 8 and the cover disk 4. Other modifications can be made to the overall design of the hub cap assembly can be made without departing from the scope of the overall invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A wheel cover assembly for fitting to the exterior of a vehicle hub which is mounted on a vehicle axle comprising:
   (a) a wheel cover disk;
   (b) a hub arm which has reinforcing ribs thereon and is removably attachable in an axial direction to the interior face of the wheel cover disk;
   (c) a weight which is connected to the base of the hub arm; and
   (d) a base plate which has stud receiving holes formed therein for removable connection to the vehicle hub, the base plate being rotatably connected to the hub arm.

2. A cover assembly as claimed in claim 1 including at least one guide member located on the inside face of the wheel cover disk, the member cooperating with a corresponding guide member formed in the hub arm in a manner which ensures that the cover disk is fitted to the hub arm in only one position.

3. A cover assembly as claimed in claim 2 wherein the interior face of the wheel cover disk includes at least two guide members which are protrusions which fit into corresponding guide member receptacles in the hub arm.

4. A cover assembly as claimed in claim 1 wherein the base plate is connected to the hub arm by a shaft.

5. A cover assembly as chimed in claim 1 including a pair of protrusions with holes therein which fit within a corresponding pair of protrusion receiving receptacles located in the hub arm, the protrusions and protrusion receiving receptacles being secured together by securement members.

6. A cover assembly as claimed in claim 1 including a pair of spaced apart hub arm guides located on the inside face of the cover disk, the guides respectively receiving between them the sides of the hub arm, when axially fitted against the interior face of the wheel cover disk.

7. A cover assembly as claimed in claim 2 wherein the base plate is secured by a base connection to a shaft which fits within a rotatable bearing which is formed in an interior region of the hub arm and enables the base plate, base connection and bearing shaft to rotate relative to the hub arm and the cover disk.

8. A cover assembly as claimed in claim 1 wherein the weight is pivotal relative to the hub arm.

9. A cover assembly as claimed in claim 1 wherein the weight is affixed relative to the hub arm.

10. A cover assembly as claimed in claim 6 wherein the hub arm guides have reinforcing ribs thereon.

11. A cover assembly as claimed in claim 7 wherein the base plate, base connection, bearing shaft and hub arm are fitted over the guide members formed in the inside face of the cover disk in a direction which is perpendicular to the plane of the cover disk.

12. A cover assembly as claimed in claim 11 wherein the base plate is a circular ring with stud receiving holes therein and the base connection has three legs for affixing the base connection to the base plate.

13. A cover assembly as claimed in claim 3 wherein the guide protrusions are disposed in an asymmetrical pattern so that the cover disk can be affixed to the hub arm in only one orientation.

14. A cover assembly as claimed in claim 1 wherein the assembly includes on the cover disk or the hub arm a position memnber that ensures that the cover disk and the hub arm can be secured together in only one position.

15. A cover assembly as chimed in claim 1 including at least one spacer member between the cover disk and the hub arm.

16. A cover assembly as claimed in claim 1 including a directional arrow on the wheel cover disk.

17. A cover assembly as claimed in claim 1 including at least one stud hole insert which can be installed into a stud receiving hole.

18. A wheel cover assembly for fitting to the exterior of a vehicle hub which is mounted on a vehicle axle comprising:
   (a) a wheel cover disk;
   (b) a hub arm which is removably attachable in an axial direction to the interior face of the wheel cover disk;
   (c) a weight which is connected to the base of the hub arm;
   (d) a base plate which has stud receiving holes formed therein for removable connection to the vehicle hub, the base plate being rotatably connected to the hub arm; the base plate being secured by a base connection to a shaft which fits within a rotatable bearing which is formed in an interior region of the hub arm and enables the base plate, base connections and bearing shaft to rotate relative to the hub arm and the cover disk; the base plate, base connection, bearing shaft and hub arm being fitted over guide members formed in the inside face of the cover disk in a direction which is perpendicular to the plane of the cover disk; the base plate being a circular ring with stud receiving holes therein and the base connection having three legs for affixing the base connection to the base plate; and
   (e) at least one guide member located on the inside face of the wheel cover disk, the member cooperating with a corresponding guide member formed in the hub arm in a manner which ensures that the cover disk is fitted to the hub arm in only one position.

19. A wheel cover assembly for fitting to the exterior of a vehicle hub which is mounted on a vehicle axle comprising:
   (a) a wheel cover disk; the interior face of the wheel cover disk including at least two guide members which are protrusions which fit into corresponding guide member receptacles in the hub arm; the guide protrusions being disposed in an asymmetrical pattern so that the cover disk can be affixed to the hub arm in only one orientation;
   (b) a hub arm which is removably attachable in an axial direction to the interior face of the wheel cover disk;
   (c) a weight which is connected to the base of the hub arm;
   (d) a base plate which has stud receiving holes formed therein for removable connection to the vehicle hub, the base plate being rotatably connected to the hub arm; and
   (e) at least one guide member located on the inside face of the wheel cover disk, the member cooperating with a corresponding guide member formed in the hub arm in a manner which ensures that the cover disk is fitted to the hub arm in only one position.

* * * * *